June 25, 1929.   H. M. ROCKWELL   1,718,381
BEARING
Filed Sept. 10, 1920
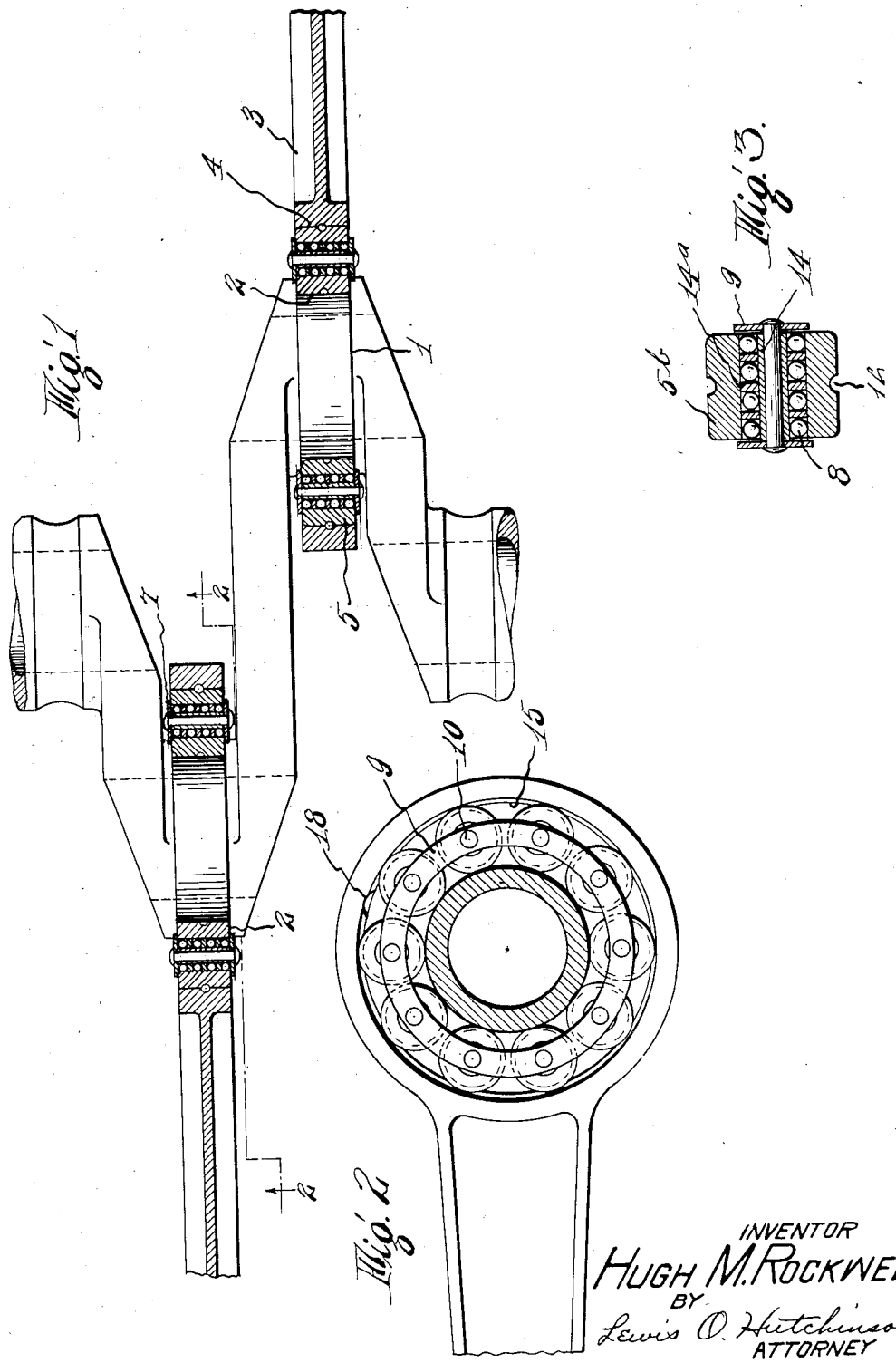
INVENTOR
HUGH M. ROCKWELL
BY
Lewis O. Hutchinson
ATTORNEY Patented June 25, 1929.

1,718,381

UNITED STATES PATENT OFFICE.

HUGH M. ROCKWELL, OF BRISTOL, CONNECTICUT.

BEARING.

Application filed September 10, 1920. Serial No. 409,340.

This invention relates to antifriction bearings and more especially to a bearing suitable for use on the crank pin of a crank shaft of a prime mover or wherever reciprocatory movement is transformed into rotary movement.

Attempts have been made to use antifriction bearings between the connecting rods and crank pins of an internal-combustion engine. These attempts have not been successful because of the peculiar forces to which the antifriction elements are subjected. The throw of the bearing about an axis external to itself causes the antifriction elements to slide first one way and then the other, due to the difference in the force exerted on the elements and the change in direction of the force produced by the changing of the direction of travel of the antifriction elements from the axis of the crank shaft. This sliding of the antifriction elements takes place opposite the point at which the load is applied to the bearing and results in a quick deterioration of the raceways, thereby cutting short the useful life of the bearing. Cages of the usual type do not prevent this sliding as the inertia or momentum of the anti-friction elements under these forces is so great that the cages are distorted or destroyed entirely.

Furthermore, the rotation of the cage about the axis of the crank shaft subjects the cage to the action of centrifugal force which presses the cage against the antifriction elements and nullifies to a considerable extent the advantage gained from the use of these elements and causes a great amount of wear on the spacing means.

The object of this invention is the provision of a bearing between the connecting rod and crank pin which reduces friction therebetween to a minimum and which is relatively light in weight but capable of withstanding the conditions to which a crank throw bearing is subjected.

Another object of this invention is to provide an anti-friction bearing in which the cage is sufficiently rugged to prevent the skidding or sliding of the antifriction elements.

A further object of the invention is the provision of a bearing connecting the crank pin and the connecting rod in which the contacting or bearing surfaces are continuous and uninterrupted.

Still another object of the invention is the provision of an arrangement of the separator relative to the antifriction elements whereby the thrust of the separator under the influence of centrifugal force is taken on antifriction balls.

Other objects of the invention will become apparent as the specification proceeds.

In the accompanying drawings is disclosed an embodiment of the invention wherein Fig. 1 is a fragmentary plan view, partly in section, of the crank shaft and connecting rods, the outer ends of the connecting rods being broken away;

Fig. 2 is a section on line 2—2 of Fig. 1;

Fig. 6 is an enlarged section through a roller.

In the embodiment of the invention specifically disclosed herein a crank pin 1 of the crank shaft constitutes the inner race member of a bearing and is provided with a flat bottom groove 2 cut in the surface thereof to form a raceway. The outer race member comprises a connecting rod 3 having an aperture at its inner end, the enclosing surface of which forms a raceway 4 to cooperate with the raceway 2 between which are interposed the anti-friction elements.

The anti-friction elements comprise tubular rollers 5$^b$. These rollers are provided with cages comprising rings 9 connected together by rivets 10 which pass through the bores of the rollers 5$^b$. The rings 9 are spaced apart and held against the heads of the rivets 10 by sleeves 14 and a plurality of rows of anti-friction balls 8 are interposed between the sleeves 14 and the inner surfaces of the bores of the rollers. These balls are kept in their respective rows by spacing rings 14$^a$.

The raceway 4 preferably is a plain cylindrical surface provided with an annular groove in which is arranged a wire 15. The rollers are formed with similar grooves 16 which receive the wire 15. The engagement of the wire 15 in the grooves 16 locates the connecting rod axially of the rollers, which in turn are held against axial movement by the shoulders of the groove 2. In one wall of the groove 2 is cut a notch, which, together with the notch 18 provided in the wire 15 permits the rollers to be interposed between the raceways.

To assemble this bearing, the end of the crank shaft is slipped through the aperture in the inner end of the connecting rod, which is then slipped along the shaft until it encircles a crank pin. If the bearing is of the type having the wire 15, this wire may be placed in its groove either before or after the connecting rod is placed on the crank pin. After the connecting rod is located on the crank pin, the rollers 8 are inserted between the raceways. When the rollers are all arranged between the race members, the sleeves or bushings and balls are placed and the rivets passed through the sleeves or bushings and joined to the rings.

The arrangement above described effectively maintains the rollers in spaced relation since the rivets 10 are sufficiently rugged to withstand the tendency of the rollers to shift their positions relative to each other. The thrust of the connecting rod binds certain of the rollers between the race members sufficiently tight to prevent movement thereof, and since the remaining rollers are held in their spaced relation, there is no slippage of them. The separators assist in holding the rollers in circumferential alinement and the engagement of the wire 5 in the grooves of the rollers locates the connecting rod axially of the crank pin. The rollers themselves lock together the connecting rod and crank pin, forming a self-contained unit so that the crank shaft and connecting rods may be handled in a group.

What I claim is:

1. An antifriction bearing comprising inner and outer race members, a plurality of tubular rollers interposed between said race members, rings concentric with said race members, rods extending between said rings and passing through said rollers, sleeves mounted on said rods a plurality of rows of balls interposed between each of said sleeves and spacing rings between said rows of balls.

2. An antifriction bearing comprising inner and outer race members, a plurality of tubular rollers interposed between said race members, rings concentric with said race members, pins extending between said rings and passing through said rollers, sleeves on said pins, a plurality of rows of anti-friction members interposed between each of said sleeves and its corresponding roller and means for spacing apart adjacent rows of anti-friction members.

3. An antifriction bearing comprising inner and outer race members, a plurality of tubular rollers interposed between said race members, rings concentric with said race members, pins extending between said rings and passing through said rollers and sleeves on said pins for spacing and alining said rings and anti-friction members interposed between each of said sleeves and its corresponding roller.

4. An antifriction bearing comprising inner and outer race members, a plurality of tubular rollers interposed between said race members, rings concentric with said race members, pins extending between said rings and passing through said rollers, sleeves on said pins, said rings being clamped between the ends of said sleeves and heads formed on said pins and anti-friction members interposed between each of said sleeves and its corresponding roller.

5. An antifriction bearing comprising inner and outer race members, a plurality of tubular rollers interposed between said race members, rings concentric with said race members, pins extending between said rings and passing through said rollers, sleeves on said pins, said rings being clamped between the ends of said sleeves and heads formed on said pins whereby said rings are spaced and alined, a plurality of rows of balls interposed between each of said sleeves and its corresponding roller, and means for spacing apart adjacent rows of balls.

6. An antifriction bearing comprising inner and outer race members, a plurality of tubular rollers interposed between said race members, rings concentric with said race members, pins extending between said rings and passing through said rollers, sleeves on said pins, said rings being clamped between the ends of said sleeves and heads formed on said pins whereby said rings are spaced and alined, and a plurality of rows of balls interposed between each of said sleeves and its corresponding roller.

HUGH M. ROCKWELL.